United States Patent
Wu et al.

(10) Patent No.: US 11,373,512 B2
(45) Date of Patent: Jun. 28, 2022

(54) APPLYING MACHINE INTELLIGENCE FOR LOCATION-BASED SERVICES TO DISPATCH FIRST RESPONDERS

(71) Applicant: T-Mobile USA, Inc., Bellevue, WA (US)

(72) Inventors: ChihChin Wu, Bellevue, WA (US); Boua Lor, Renton, WA (US); Jie Hui, Mercer Island, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/389,143

(22) Filed: Jul. 29, 2021

(65) Prior Publication Data

US 2022/0036721 A1    Feb. 3, 2022

Related U.S. Application Data

(60) Provisional application No. 63/058,338, filed on Jul. 29, 2020.

(51) Int. Cl.
*G08B 25/00* (2006.01)
*G08B 27/00* (2006.01)
*H04W 4/90* (2018.01)

(52) U.S. Cl.
CPC ......... *G08B 25/003* (2013.01); *G08B 25/007* (2013.01); *G08B 27/001* (2013.01); *H04W 4/90* (2018.02)

(58) Field of Classification Search
CPC .................................................. G08B 25/003
See application file for complete search history.

(56) References Cited

U.S. PATENT DOCUMENTS

| | | | |
|---|---|---|---|
| 10,756,916 B2 * | 8/2020 | Kane | H04W 4/08 |
| 2004/0176123 A1 * | 9/2004 | Chin | H04L 12/2854 455/404.1 |
| 2019/0335307 A1 * | 10/2019 | Marzorati | H04W 4/90 |
| 2021/0158670 A1 * | 5/2021 | Derickson | G08B 27/001 |
| 2021/0407028 A1 * | 12/2021 | Jacob Da Silva | G06F 1/1613 |

* cited by examiner

*Primary Examiner* — Travis R Runnings
(74) *Attorney, Agent, or Firm* — Han Santos, PLLC

(57) ABSTRACT

Techniques are described herein for applying a selective automated response to a distress call received at an emergency services system. The techniques include receiving a distress call from a user device in response to an emergency event. The distress call may be parsed to identify a location, an urgency index, and a nature of the emergency event. The distress call may be routed to an available dispatcher at a dispatcher terminal. Based at least on the location, the urgency index, and the nature of the emergency event, a response procedure to resolve the distress call may be identified. The dispatcher may communicate with a dispatched first responder at the location via a communication channel established between the dispatcher terminal and a mobile first responder terminal. The response procedure may be transmitted to the mobile first responder terminal.

20 Claims, 5 Drawing Sheets

APPLYING MACHINE INTELLIGENCE FOR LOCATION-BASED SERVICES TO DISPATCH FIRST RESPONDERS

CROSS-REFERENCE TO RELATED PATENT APPLICATION

This application claims priority to U.S. Provisional Patent Application No. 63/058,338, filed on Jul. 29, 2020, and entitled "Applying Machine Intelligence for Location-Based Services to Dispatch First Responders," which is hereby incorporated by reference in its entirety.

BACKGROUND

In emergencies, the timely assistance provided by emergency service personnel is often critical to minimize injuries, save lives, and/or minimize property damages. A mere delay of a few minutes, or even a matter of seconds, may have severe consequences in saving the life of an individual, such as an individual having a heart attack or individual suffering from severe blood loss. Likewise, delays in reaching the scene of a fire or other catastrophic event may have catastrophic consequences to property damage. Therefore, it is essential to minimize the time it takes for emergency personnel, such as police, fire, and medical personnel, to reach the location to respond to the emergency.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
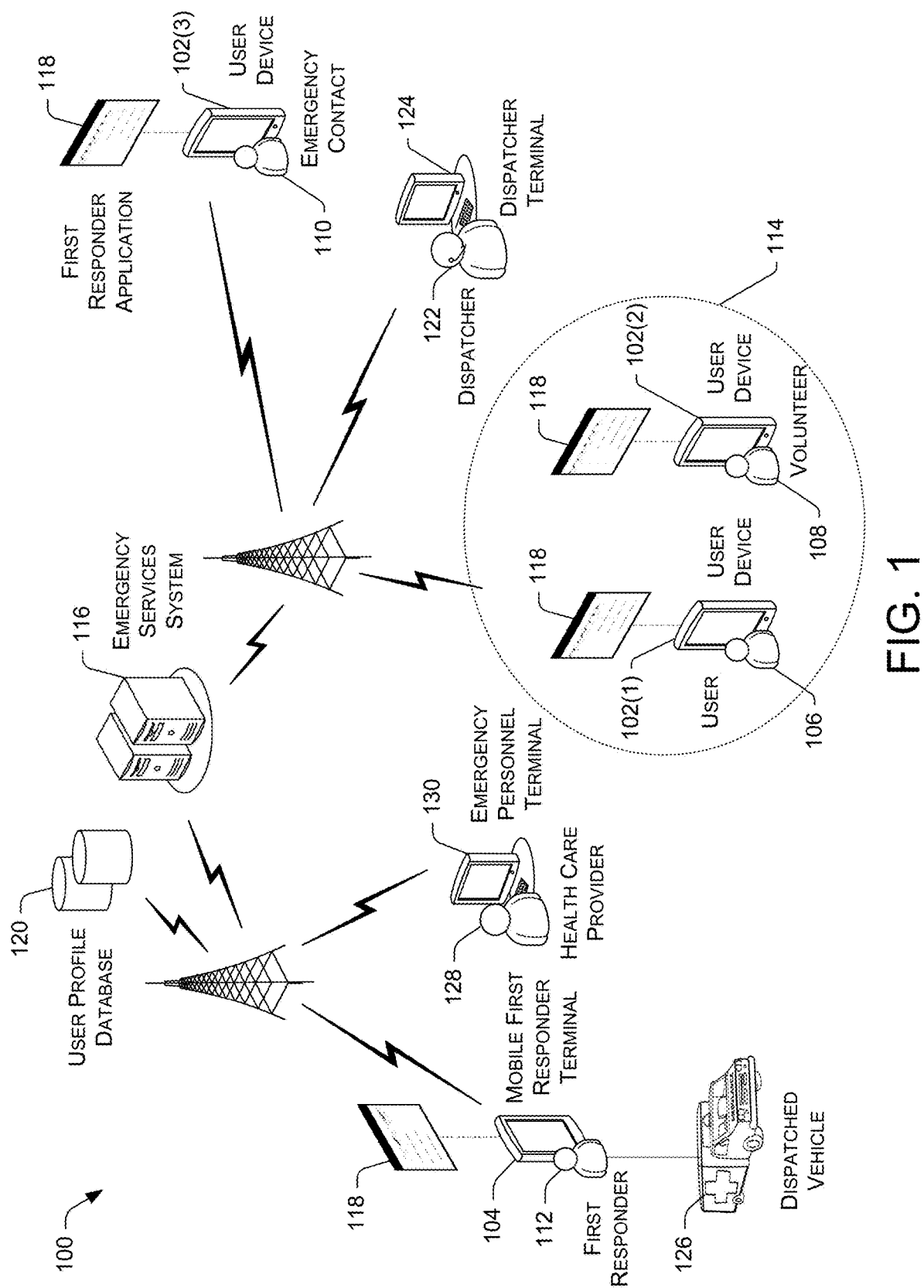
FIG. 1 illustrates an example of a network architecture for applying selective automated response to a distress call for emergency services.

The disclosure describes techniques that apply a selective automated response to a distress call received at an emergency services system. The distress call may include audio, video, a social media messaging service, an email, and/or other forms of electronic messaging from a calling party to indicate the presence of imminent danger, threat, material or physical injury, or other emergency events that require assistance from a first responder, emergency personnel, law enforcement, a volunteer, and/or other types of services that can render emergency services. The calling party may include a victim, a client, a customer, a volunteer, or other users who can be a subscriber of a first responder application of the emergency services system. The first responder application is configured to facilitate communications with the calling party's emergency contacts and/or providers of various emergency services in the event of an emergency. Emergency services may include volunteer support, emergency personnel or infrastructure support, third-party notifications support, and the like. Alternatively, or additionally, the emergency services may include automated advisory services in case of non-urgent situations.

A user device may implement the first responder application that can include hardware, software, or a combination thereof, to provide emergency services to a user (i.e., a calling party). The user device may include a mobile device, a server, a laptop, or any other device that has the capability of using wired/wireless communications. In an embodiment, the first responder application may utilize a database such as a user profile database that can include health and personal information about the user. For example, upon subscription of the user to the first responder application, the user may enter information about his or her emergency contact to be notified when calling 9-1-1 or when the first responder application is activated. The user may also enter his or her health data, specify consent to various types of medical treatment, and/or limit authorization to access the user's medical health history from other databases. In an implementation, the first responder application may be activated by a user request or upon detection of an emergency event that can be associated with the distress call such as a car crash where the user may not be able to physically make the 9-1-1 emergency call.

In some aspects, the emergency services system may implement natural language processing (NLP) and/or natural language understanding (NLU) to determine the literal and intended meaning of the distress call. In one example, speech from an incoming voice call or text from an incoming message may be parsed to determine the nature of the emergency, the location of the emergency, and the urgency index of the distress call. Additionally, the distress call may be authenticated based at least on sentiment analysis to identify prank calls, robocalls, and/or other non-emergency calls.

Upon authenticating the distress call, the emergency services system may identify an appropriate response procedure and/or transmit an automated response to further gather additional information. In some aspects, the emergency services may access the user profile database to retrieve the user's health data and other information depending upon the user's privacy settings and applicable privacy policy. Additionally, the distress call may be routed to an emergency personnel terminal, a dispatcher station, a health care provider, law enforcement, and/or so forth. The emergency services system may broadcast a notification or an alert to registered volunteers that are located within a predetermined distance of the identified distress location. A volunteer may respond to the notification or the alert to confirm his or her location and to assist the distressed calling party. The emergency services system may also send a notification to the emergency contacts. The emergency contacts may respond to the notification and/or communicate with the emergency personnel terminal, the dispatcher station, the health care provider, law enforcement, and/or so forth.

The urgency index, as described in further detail below, may include normalized numerical values that reflect an incremental grade of urgency. For example, the urgency index may reflect an incremental grade of urgency associated with the distress call and may vary from non-urgent and non-service critical (e.g., graffiti, noise nuisance, etc.) to urgent and service critical (e.g., ongoing robbery, mass casualty incident, etc.).

In some aspects, the first responder application may utilize a secure interface to provide screening questions to gather basic information and receive user input. For example, the first responder application may enable a user to make a voice call or send a text message if the user is unable to speak. Additionally, the first responder application may provide probing questions to determine a response procedure, wherein the probing questions may be provided based at least on the answers to the screening questions. Further, the first responder application may use a secure interface between the device (e.g., server) and the emergency personnel and dispatcher terminal representative.

The techniques described herein may be implemented in a number of ways. Example implementations are provided below with reference to the following figures.

Example Network Architecture

FIG. 1 includes an example of a network architecture 100 for applying selective automated response to a distress call for emergency services. The network architecture 100 may include one or more communication devices such as user devices 102(1)-102(3) and a mobile first responder terminal 104. The user devices 102(1)-102(3) and a mobile first responder terminal 104 may include or be embodied by cellular phone, a smartphone, a session initiation protocol (SIP) phone, a laptop, a personal digital assistant (PDA), a satellite radio, a global positioning system, a multimedia device, a video device a camera, a game console, a tablet, a smart device, a wearable device, or any other similar functioning device. The user devices 102(1)-102(3) and a mobile first responder terminal 104 may also be referred to as a station, a mobile station, a subscriber station or unit, a wireless unit, a mobile device, a wireless device, an access terminal, a handset, a user agent, a mobile client, or some other suitable terminology.

In FIG. 1, the user device 102(1) may be operated by a user 106. The user device 102(2) may be operated by a volunteer 108. Thus, in some instances, the user device 102(2) may be referred to as a volunteer device 102(2). The user device 102(3) may be operated by an emergency contact 110. The mobile first responder terminal 104 may be operated by a first responder 112. The user 106 and/or the volunteer 108 may be located in a distress location 114. The user 106 and/or the volunteer 108 are treated herein as a calling party who may request emergency services from an emergency services system 116. The emergency services system 116 may include general-purpose computers or other electronic devices that are capable of receiving input, processing the input, and generating output data.

The user devices 102(1)-102(3) and the mobile first responder terminal 104 are connected to a telecommunication network utilizing one or more wireless base stations or any other common wireless or wireline network access technologies. The network can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

The emergency services system 116 includes a first responder application 118 that may also reside on the user devices 102(1)-102(3) and the mobile first responder terminal 104. Generally, the first responder application 118 may be configured to facilitate communication among the emergency services system 106 and the user devices 102(1)-102(3) and the mobile first responder terminal 104.

The first responder application 118 may include an application user interface that may enable the user 106 to create and set up a user profile as a general user of the emergency services and/or as a volunteer. The user profile may be associated with a user account that corresponds to the user device 102(1). In one example, the user 106 may provide demographic information and other personal information (e.g., name, age, gender, contact information, etc.). The user 106 may also provide his or her health data and medical history information. The user may customize privacy settings to set a limit of authority to access and use the user's personal information and/or health data, track the user's activities, and/or so forth. In some examples, the user may select an option presented via the application user interface to give consent and permit the emergency services system 116 to access and use the user's personal information and/or health data. The user's personal information and/or health data may be stored in the user profile database 120.

In some aspects, the first responder application 118 may be configured to track the user's 106 activities and present notifications and alerts based at least on detected activities, time, location, and/or other factors. For instance, the first responder application 118 may display notifications in response to determining that the user 106 is located in the vicinity of a distress location. Additionally, the first responder application 118 may interface with various software and hardware components of the user device 102(1). For example, the first responder application 118 may comprise instructions, when executed by a processing unit of the user device 102(1), that activate the user device's microphone and camera upon detection of a distress call. The user 106 may also provide the contact information of the user's 106 emergency contact 110. The user 106 may identify one or more emergency contact 110 to notify in case of emergency. Additionally, the user 106 may authorize the emergency contact 110 to access the user's 106 personal information and health data.

In FIG. 1, the user 106 may initiate a distress call via the first responder application 118 that is installed on the user device 102(1). In some examples, the application user interface of the first responder application 118 may be configured to present screening questions and receive user input. The screening questions may include whether the user 106 can speak, the degree and nature of the threat, whether the user 106 is calling for another person, the particular emergency personnel that the user 106 wants to contact, and/or so forth. The screening questions may ask for physical symptoms of the user (e.g., fever, chills, cough, shortness of breath, fatigue, aches, loss of taste or smell, sore throat, congestion, nausea, etc.). Based at least on the responses to the screening questions, the first responder application 118 may recommend a response procedure and/or request additional information. Additionally, or alternatively, the detection of a distress call may be based upon the execution of a probabilistic machine-learning algorithm to determine the presence of a distress situation that requires an emergency response. Accordingly, the user 106 need not initiate a distress call to request assistance.

The answers to the screening questions that are presented via the first responder application 118 may be transmitted to the emergency services system 116. For example, the first responder application 118 may transmit user input such as recognized speech or text. The emergency services system 116 may implement NLP to parse communications from the distress call and generate one or more tokens. The location, an urgency index, the nature of the emergency event, and other information associated with the emergency event may be determined based at least on the one or more tokens generated. In some aspects, the location may also be determined via location services. The urgency index may be a normalized numerical value on a given scale (i.e., 1 to 10). The numerical value may reflect an incremental grade of urgency associated with the distress call. The urgency index may be assigned based at least on one or more predetermined factors such as the presence of imminent danger, threat, material or physical injury, and may vary from non-urgent and non-service critical (e.g., suspected attempted burglary) to urgent and service critical (e.g., on-going robbery, mass casualty incident, etc.).

Before responding to the distress call, however, the call is authenticated to determine whether the user 106 is reporting a legitimate emergency event. In some aspects, the one or more tokens may include one or more keywords that indicate that the call is authentic and the user 106 is reporting a legitimate emergency event. The keywords may be words that indicate that there is a presence of imminent danger, threat, material or physical injury, or other emergency events that require assistance from a first responder, emergency personnel, law enforcement, a volunteer, and/or other types of services that can render emergency services. Additionally, the first responder application 118 may implement NLP and/or voice tone analysis to perform sentiment analysis. The sentiment analysis may involve determining whether the one or more tokens correspond to one or more keywords that indicate a sentiment or tone that is associated with a presence of imminent danger, threat, material, or physical injury.

Upon authenticating the distress call, the emergency services system 116 may route the distress call to an available dispatcher 122 at a dispatcher terminal 124. The dispatcher 122 may include personnel who can render real-time interaction with a calling party (e.g., the user 106, the volunteer 108, etc.). In some examples, the application user interface at the dispatcher terminal 124 may enable the dispatcher 122 to access information provided by the user 106, the volunteer 108, the first responder 112, and/or so forth. The application user interface at the dispatcher terminal 124 may also enable the dispatcher 122 to access information about the calling party from external databases such as the user's 106 health data that is stored in the user profile database 120. Based at least on the location, the urgency index, and the nature of the emergency event, the emergency services system 116 may be configured to identify a response procedure to resolve the distress call. The response procedure may be presented to the dispatcher 122 at the dispatcher terminal 124 and transmitted to a mobile first responder terminal 104 that is operated by a dispatched first responder 112.

The emergency services system 116 may be configured to establish a communication channel between the dispatcher terminal 124 and the mobile first responder terminal 104 while the first responder 112 is traveling to the distress location 114 and/or on-site at the distress location 114. Accordingly, the first responder 112 may include a driver, technician, or medical personnel crew of an emergency vehicle 126. The emergency vehicle 126, for example, may include a firetruck, a police car, an ambulance, and the like. In one example, the dispatcher 122 may communicate with the first responder 122 in real-time via the first responder application 118 to monitor the emergency event. In this regard, the first responder application 118 may coordinate emergency resources to improve emergency services response to an emergency event.

In some aspects, the dispatcher 122 may communicate with a health care provider 128. The health care providers may include doctors, nurses, radiology technicians, and/or so forth. Accordingly, the emergency services system 116 may be configured to establish a communication channel between the dispatcher terminal 124 and an emergency personnel terminal 130. The emergency personnel terminal 130 may be located at a hospital, a clinic, and/or other health care facilities. In one example, the dispatcher 122 may notify the health care provider 128 that the user 106 is en route to the hospital emergency room at which the health care provider 128 is located. Additionally, or alternatively, the first responder 112 may communicate directly with the health care provider 128 at the emergency personnel terminal 130 to provide up to date information in transit from the distress location 114. The health care provider 128 may request the user's 106 health data, medical history information, and/or other such data from the user profile database 120.

In response to the distress call, the emergency services system 116 may identify an emergency contact 110 that is associated with a user profile. Upon identifying the emergency contact 110, the emergency services system 116 may transmit a notification to the emergency contact 110 at the user device 102(2). The notification may include an automated message containing information associated with the emergency event. The emergency contact 110 may be prompted to respond to additional questions about the user 106 such as the user's 106 health data, medical history, next of kin, and/or so forth.

In some aspects, the emergency services system 116 may implement location services to identify additional devices such as the user device 102(2) that is located within a predetermined distance of the location 114 of the emergency event. A volunteer 108 may be individuals that opt in to offer personal services when asked to render assistance by the emergency services system 116. The emergency services system 116 may maintain a data table of registered volunteers, the volunteers' contact information, the volunteers' professional occupation, certifications (e.g., CPR and first aid certification), devices information (e.g., device identifiers) associated with the volunteers, and/or so forth.

Upon detecting the volunteer 108 in the vicinity of the distress location 114, the emergency services system 116 may notify the user device 102(2) of the emergency event and query the user device 102(2) to confirm whether the volunteer 108 will participate in assisting the user 106 (i.e., the calling party). If the volunteer 108 opts in to participate, the volunteer 108 can respond to the query and/or select an option to participate via the first responder application 118. Upon receiving a confirmation to participate from the user device 102(2), the emergency services system 116 may transmit a response procedure to the user device 102(2). For example, the emergency services system 116 may transmit instructions to perform CPR and first aid.

In some aspects, the emergency services system 116 may request and receive additional information from the volunteer 108. For example, the emergency services system 116 may request and receive images (pictures), videos, audio, or other data from the location 114. The images may show a scene of an accident or document an injury on a person. In some aspects, the emergency services system 116 may receive data streams (e.g., video streams, audio streams, etc.). Upon receiving additional information from the volunteer 108, the emergency services system 116 may transmit the additional information to the dispatcher terminal 124, the mobile first responder terminal 104, the emergency personnel terminal 130, and/or so forth. Additionally, the emergency services system 116 may transmit a response procedure to the user device 102(2) based at least on the received additional information. For instance, the emergency services system 116 may implement one or more image processing techniques in order to identify an object of interest (e.g., a person's injured limb) in an image in order to determine an appropriate response procedure and transmit response instructions.

Example Emergency Services System Components

Figure 2:
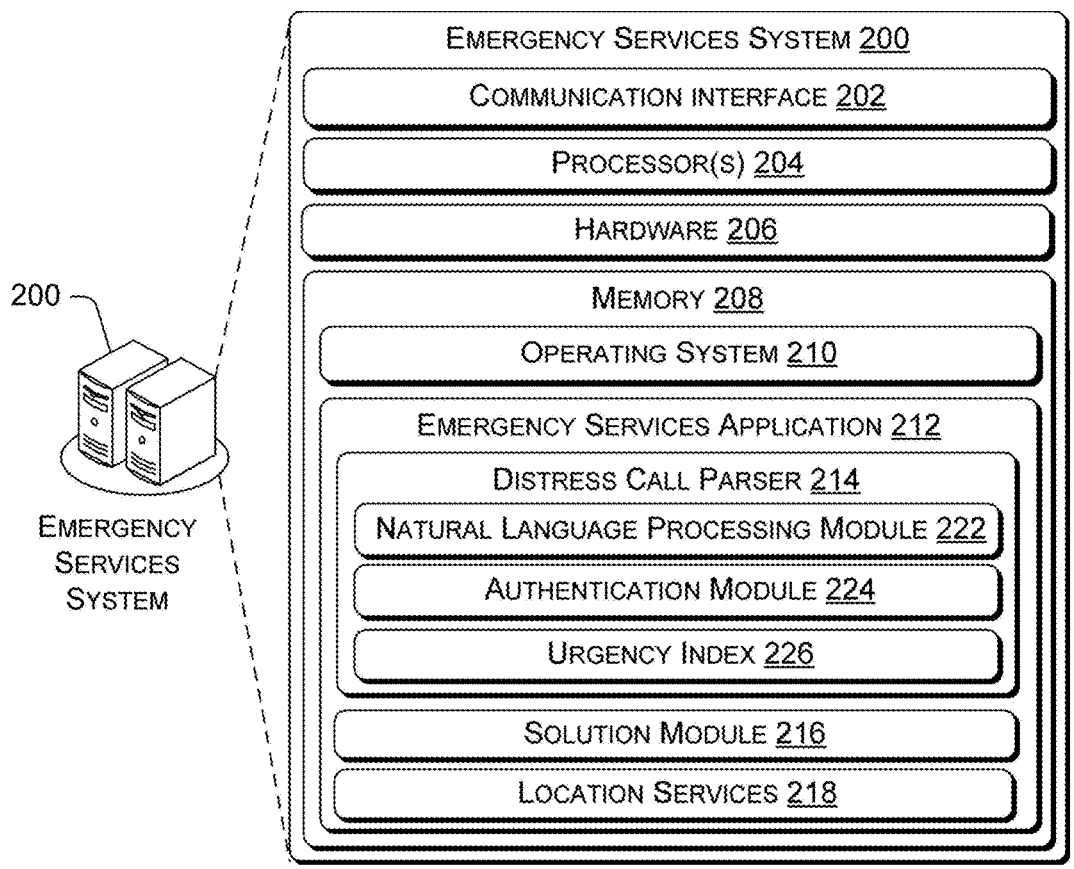
FIG. 2 is a block diagram showing various components of an illustrative emergency services system that implements a process for improving emergency service response to a received distress call.

FIG. 2 is a block diagram showing various components of an illustrative emergency services system 200 that implements a process for improving emergency service response to a received distress call. The emergency services system 200 as described herein can operate with more or fewer of the components shown herein. Additionally, the emergency services system 200 shown herein or portions thereof can serve as a representation of one or more of the servers of the present system.

The emergency services system 200 may include a communication interface 202, one or more processors 204, hardware 206, and memory 208. The communication interface 202 may include wireless and/or wired communication components that enable the emergency services system 200 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include an additional user interface, data communication, or data storage hardware. For example, the user interfaces may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the emergency services system 200.

The processor(s) 204 and the memory 208 of the emergency services system 200 may implement an operating system 210 and a emergency services application 212. The operating system 210 may include components that enable the emergency services system 200 to receive and transmit data via various interfaces (e.g., user controls, communication interface, and/or memory input/output devices), as well as process data using the processor(s) 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The emergency services application 212 may include routines, program instructions, objects, and/or data structures that perform particular tasks or implement particular abstract data types. Generally, the emergency services application 212 may include one or more instructions which, when executed by the one or more processors 204, direct the computing devices 200 to perform operations related to applying selective automated response to a distress call for emergency services. The emergency services application 212 may include one or more software components such as a distress call parser 214, a solution module 216, an interaction support module 218, and location services 220.

The distress call parser 214 may include one or more instructions which, when executed by the one or more processors 204, direct the computing devices 200 to perform operations related to parsing speech from an incoming voice call or text from an incoming message to obtain information about a reported emergency event. The distress call parser 214 may be configured to receive communications via the communication interface 202. In one aspect, the distress call parser 214 may implement an artificial intelligence-based natural language processing module 222 to determine the literal and intended meaning of the received distress calls. For instance, the natural language processing module 222 may identify the location, the urgency, the nature of an emergency event, and other information associated with the emergency event.

The natural language processing module 222 may be trained such that it can determine whether a received communication is reporting a legitimate emergency event. In some embodiments, the natural language processing module may be configured to apply natural language processing to a received communication to determine whether a distress call is related to an emergency event. For example, a user may say "I have an emergency" or "Help," and the natural language processing module 222 is trained such that it is capable of determining that there is an emergency event associated with the call. The natural language processing module 222 may also screen the received communication for varying tone, intonation, and sentiment to determine the semantic meaning of the received communication. In some embodiments, the natural language processing module 222 may utilize machine learning to decipher the meaning of the received communication.

In some aspects, the natural language processing module 222 may apply a set of rules to the received communication to determine whether the received communication is reporting a legitimate emergency event. In one example, the natural language processing module 222 may be configured to identify predetermined keywords and determine that there is an emergency based on the presence of one or more predetermined keywords in the received communication. The natural language processing module 222 may be configured to determine common meanings between received communications to match them to a specific type of emergency event in view of the keywords.

In some embodiments, the natural language processing module 222 may calculate a confidence interval in the received communication having a certain meaning. The natural language processing module 222 may be trained by the user providing the module a collection of keywords associated with a type of emergency event or asking the user queries in multiple different ways. In some embodiments, the natural language processing module 222 may generate a vector including a representation for each word in the communication, and it may be determined that the received communications relate to a certain type of an emergency event based on the vector trajectory for the words in the communication.

The authentication module 224 may include one or more instructions which, when executed by the one or more processors 204, direct the computing devices 200 to perform operations related to screening distress calls and authenticating valid calls. In some aspects, the authentication module 224 may determine a distress call is authentic based at least on the determined meaning of the call. Additionally, or alternatively, the authentication module 224 may also verify the identity of the calling party based at least on the device identification of the call originating device, location of the call originating device, and information about the calling party. For example, the authentication module 224 may determine that the call originating device is located in California, but the calling party is requesting assistance for a reported emergency event is located in New York. Because the location of the call originating device is not substantially equivalent to the location of the emergency event, the authentication module 224 may determine that the distress call is not authentic.

After authentication, the distress call parser 214 may generate the urgency index 226 to reflect the urgency of the received request. In one example, the distress call parser 214 may classify the nature of the incident that is the subject of the distress call. An ongoing crime, a vehicular accident, a natural disaster, and/or other situations that may cause imminent harm to a person and/or property may fall under urgent request. Conversely, a petty crime, a missing item, and other cases that may not cause imminent or future harm to a person or property may fall under non-urgent requests.

The solution module 216 may include one or more instructions which, when executed by the one or more processors 204, direct the computing devices 200 to perform operations related to generating a response to a distress call. The response may be based at least on data parsed from the distress call, information from the client profile database, location data, and/or so forth. The generated response may include transmitting notifications and alerts to volunteers, dispatchers, first responders, health care providers, emergency personnel, law enforcement, and/or the emergency vehicles in the vicinity of the distress location.

The solution module 216 may also implement probabilistic machine learning algorithms to identify a response procedure to resolve the distress call based at least on the location, the urgency index, and/or the nature of the emergency event. The response procedure may be a standard operating procedure. In some embodiments, the solution module 216 may implement a feedback mechanism that may be configured to provide an additional response procedure upon determining that the initial response procedure was not successful. Additionally, or alternatively, the solution module 216 may also request additional information or data from the calling party and/or other data sources such as a user profile database.

The user profile database may include information such as health data and other personal information of the calling party. The privacy policy may include a power of attorney (POA), consent, and other disclosures that the calling party has pre-agreed to be shared with the emergency personnel, dispatcher terminal, and guardian/relatives of the calling party. In some examples, the privacy policy may include contracts such as the personal will that the calling party executed in case of death of the calling party.

The location services 218 may include one or more instructions which, when executed by the one or more processors 204, direct the computing devices 200 to perform operations related to determine location information of one or more user devices. For example, the location services 218 may be configured to interface with a location server to obtain real-time or near real-time location information that is associated with a user device that is associated with a calling party (i.e., a user, a volunteer, etc.). The location services 218 may also be configured to keep track of the location of the dispatched first responder and emergency vehicles.

The location services 218 may be configured to render a geographical map of locations of the calling party, the first responder, and emergency vehicle on an application user interface that may be accessible at various client terminals such as a user device, a mobile first responder terminal, a dispatcher terminal, an emergency personnel terminal, and/or so forth. Accordingly, the location services 218 may share location information of a user with a volunteer, a first responder, a dispatcher, a health care provider, law enforcement, and/or so forth.

Example Process

Figure 3:
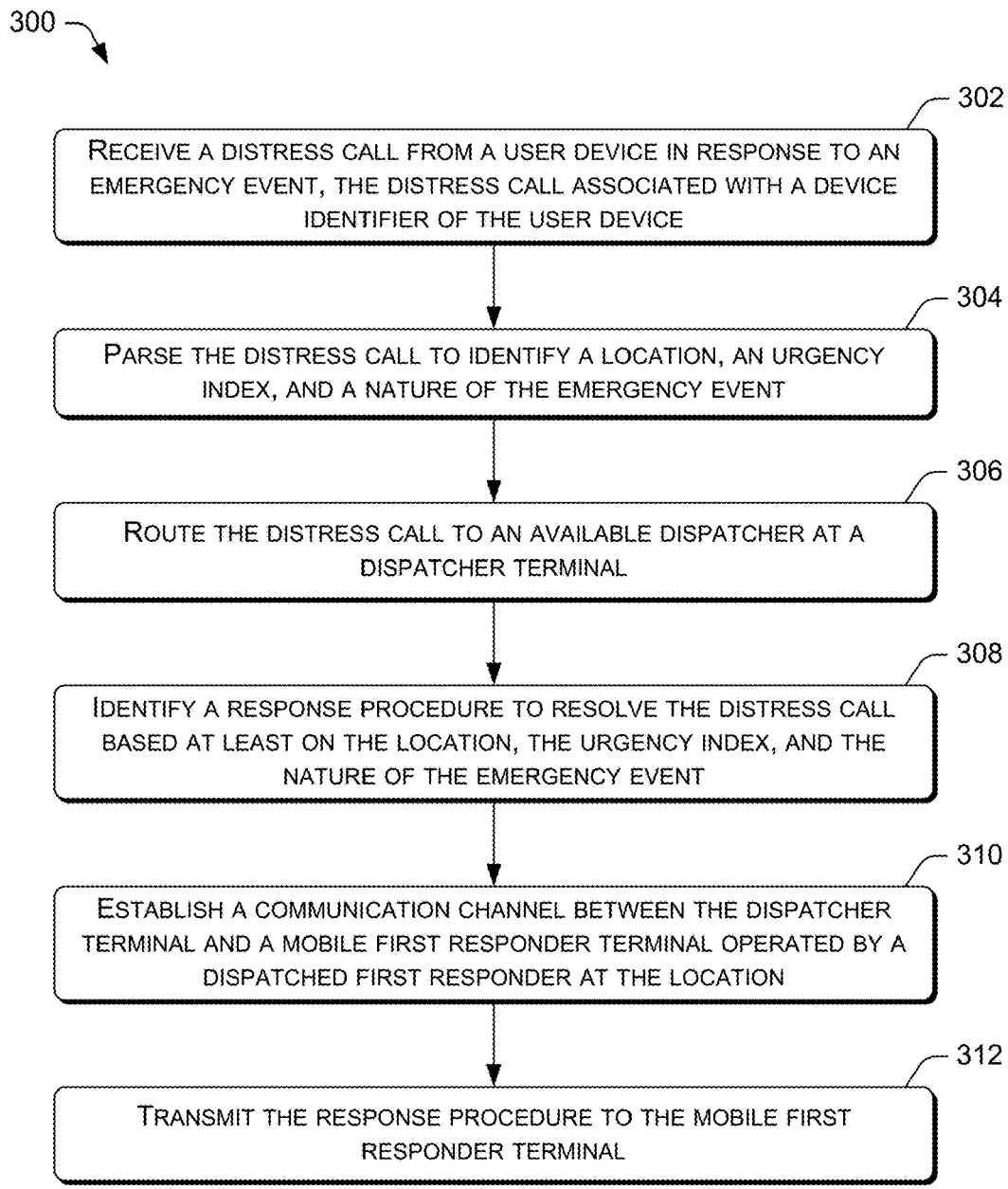
FIG. 3 is a flow diagram of an example process for monitoring distress calls from the perspective of an illustrative emergency services system.
Figure 4:
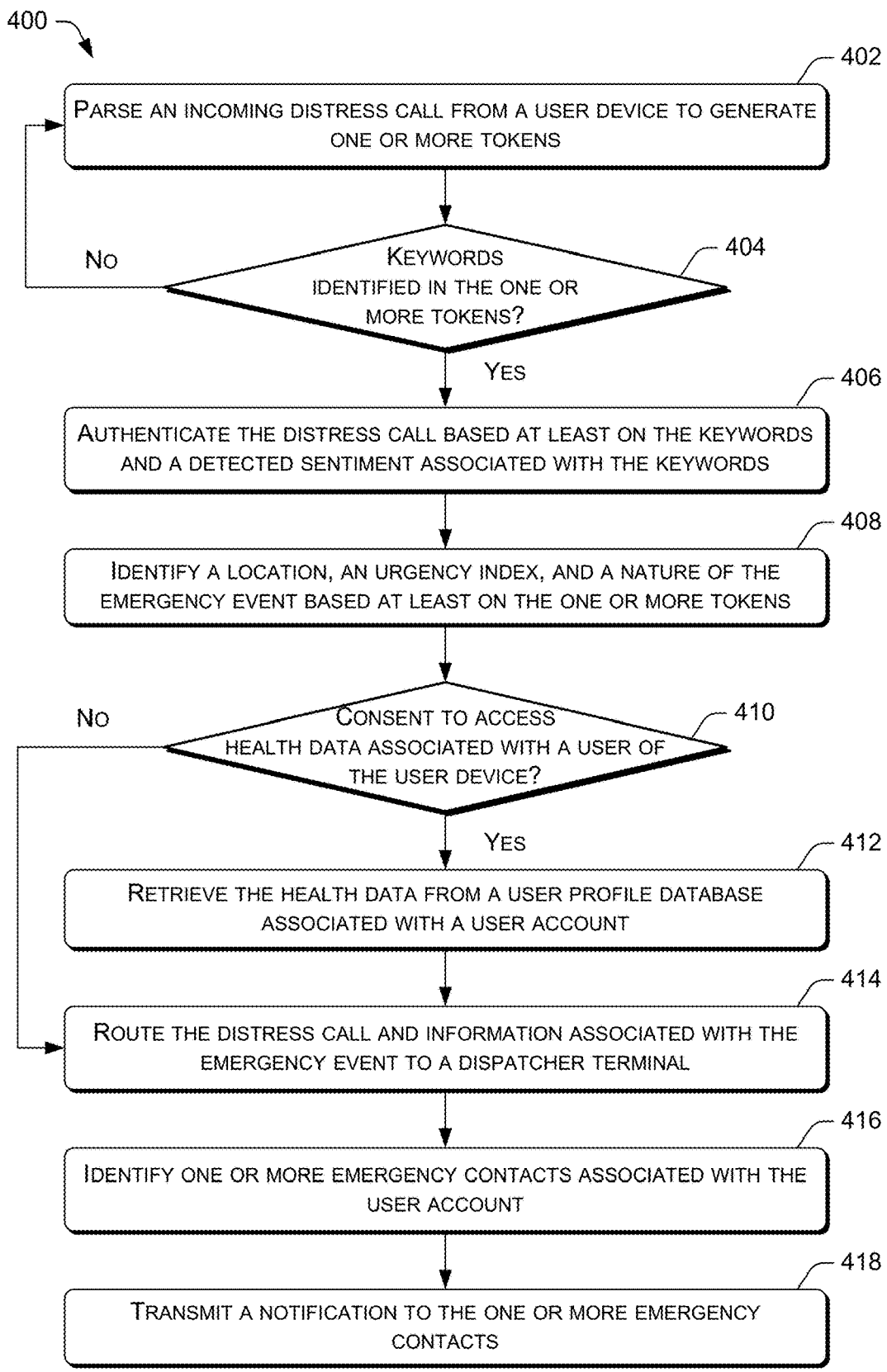
FIG. 4 is a flow diagram of an example process for authenticating incoming distress calls and obtaining information associated with an emergency event to communicate with a dispatcher terminal and emergency contacts.
Figure 5:
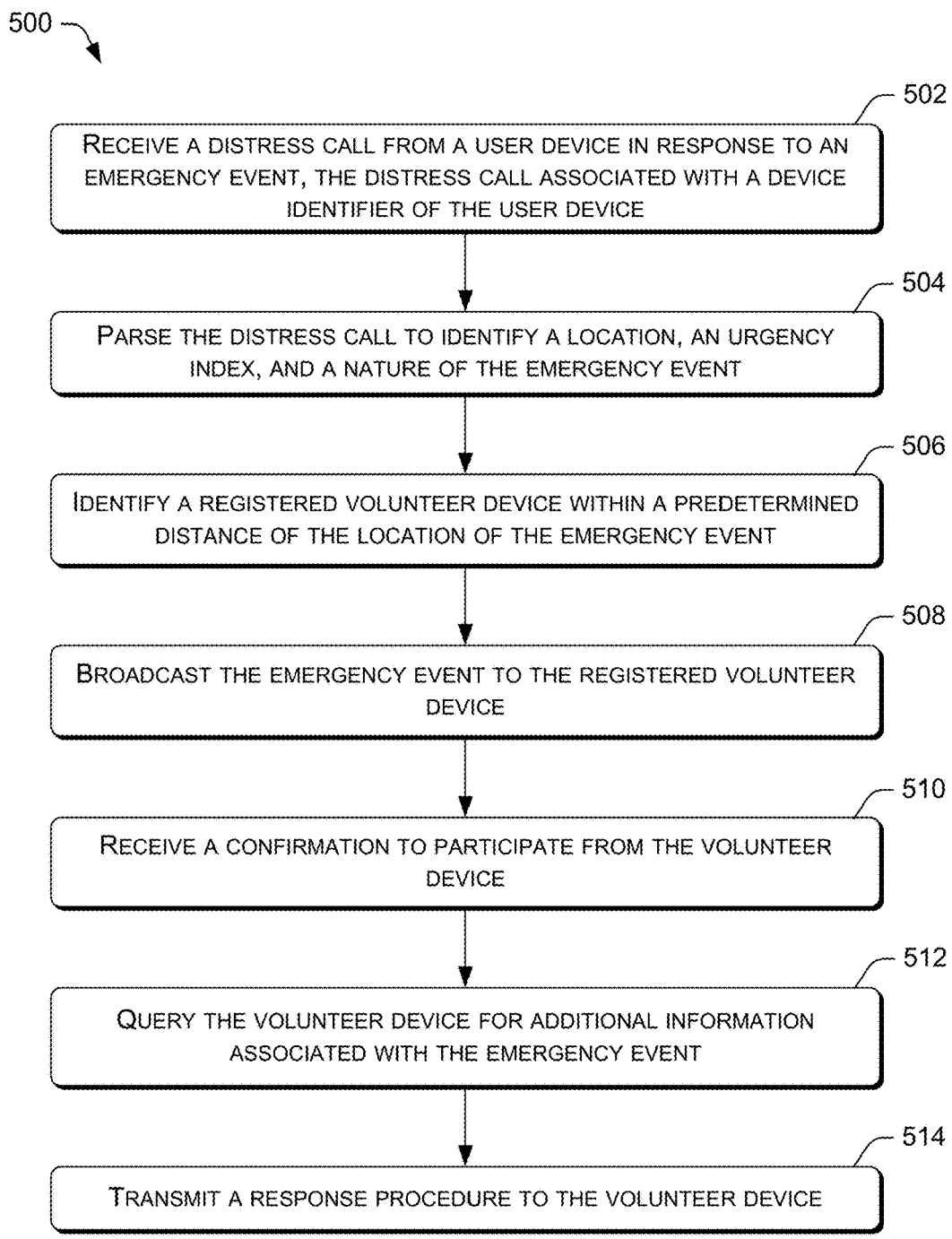
FIG. 5 is a flow diagram of an example process for locating and communicating with onsite volunteers in the vicinity of an emergency event.

FIG. 3-5 present illustrative process 900 for improving emergency services response to a received distress call. The processes 300-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to FIGS. 1 and 2.

FIG. 3 is a flow diagram of an example process 300 for monitoring distress calls from the perspective of an illustrative emergency services system. At block 302, an emergency services system receives a distress call from a user device in response to an emergency event, the distress call associated with a device identifier of the user device. At block 304, the emergency services system parses the distress call to identify a location, an urgency index, and the nature of the emergency event. In one example, the emergency services may implement NLP to parse recognized speech or text from the distress call and determine the meaning of the distress call.

At block 306, the emergency services system routes the distress call to an available dispatcher at a dispatcher terminal. The dispatcher may communicate directly with the calling party and continuously monitor the emergency event. Additionally, the dispatcher may request additional information from the calling party. At block 308, the emergency services system identifies a response procedure to resolve the distress call based at least on the location, the urgency index, and the nature of the emergency event. The response procedure may be a recommended standard operating procedure that is selected from a plurality of response procedures. At block 310, the emergency services system establishes a communication channel between the dispatcher terminal and a mobile first responder terminal operated by a dispatched first responder at the location. Accordingly, the dispatcher may directly communicate with the dispatched first responder.

At block 312, the emergency services system transmits the response procedure to the mobile first responder terminal. In some aspects, the dispatched first responder may provide feedback or a situation report while performing the response procedure. In response to receiving the feedback, the emergency services system may provide an alternate response procedure and/or transmit additional information such as the calling party's health data to the mobile first responder terminal.

FIG. 4 is a flow diagram of an example process 400 for authenticating incoming distress calls and obtaining information associated with an emergency event to communicate with a dispatcher terminal and emergency contacts. At block 402, the emergency services system parses an incoming distress call from a user device to generate one or more tokens. The distress call may be a voice call or a message that is transmitted to the emergency services system.

At decision block 404, the emergency services system determines whether one or more keywords are identified in the one or more tokens. The keywords may comprise words or terms that are indicative of the presence of imminent danger, threat, material or physical injury or other emergency events that require assistance from a first responder, emergency personnel, law enforcement, a volunteer, and/or other types of services that can render emergency services. In response to determining that one or more keywords are identified in the one or more tokens ("yes" from block 404), the emergency services system authenticates the distress call based at least on the keywords and a detected sentiment associated with the keywords, as indicated in block 406. For example, a sentiment such as fear, anxiety, worry, and distress may indicate that the distress call is authentic. If the emergency services system does not identify one or more keywords in the one or more tokens ("no" from block 404), the process returns to block 402.

At block 408, the emergency services system identifies a location, an urgency index, and the nature of the emergency event based at least on the one or more tokens. In some aspects, the urgency index may depend at least on the nature of the emergency event. For example, the nature of the emergency event may be classified such that situations that may cause imminent harm to a person and/or property may fall under urgent request. Conversely, situations that may not cause imminent or future harm to a person or property may fall under non-urgent requests.

At decision block 410, the emergency services system determines whether the user has consented to access the user's health data. The user may give or revoke consent at any time by updating consent information in the user profile. In response to determining user consent ("yes" from block 410), the emergency services system may retrieve the health data from a user profile database associated with a user account, as indicated in block 412. The emergency services system may implement an application programming interface (API) to retrieve the health data. If the emergency services system does not determine that the user has consented to access the user's health data, the process proceeds to block 414. At block 414, the emergency services system routes the distress call and information associated with the emergency event to a dispatcher terminal. The information associated with the emergency event may include the location of the emergency event, the urgency index, and the nature of the emergency event. At block 416, the emergency services system identifies one or more emergency contacts associated with the user account. The emergency contacts may be family members, next of kin, health care providers, and/or so forth At block 418, the emergency services system transmits a notification to the one or more emergency contacts. The notification may include the information associated with the emergency event. The notification may also include a request for additional information to assist in responding to the emergency event.

FIG. 5 is a flow diagram of an example process 500 for locating and communicating with onsite volunteers in the vicinity of an emergency event. At block 502, the emergency services system receives a distress call from a user device in response to an emergency event, the distress call associated with a device identifier of the user device. At block 504, the emergency services system parses the distress call to identify a location, an urgency index, and the nature of the emergency event. The urgency index may correspond to a normalized numerical value that corresponds to a classified emergency event.

At block 506, the emergency services system identifies a registered volunteer device within a predetermined distance of the location of the emergency event. The volunteer device may be operated by a volunteer that has opted in to assist in responding to an emergency event. At block 508, the emergency services system may broadcast the emergency event to the registered volunteer device. In this regard, the volunteer device may receive a banner notification or an alert. At block 510, the emergency services system may receive a confirmation to participate from the volunteer device. Accordingly, the volunteer need not respond to every emergency event in the vicinity of the volunteer. Additionally, more than one volunteer may opt-in to participate, for example, in situations involving natural disasters, mass casualty, and/or so forth.

At block 512, the emergency services system queries the volunteer device for additional information associated with the emergency event. For example, the emergency services system may request the volunteer to send a picture of the location or a description of the emergency event. The additional information may supplement the initial set of information collected from the distress call. At block 514, the emergency services system transmits a response procedure to the volunteer device. In some aspects, the response procedure may depend on the additional information received from the volunteer device. For example, the response procedure may include instructions to perform CPR and first aid in response to determining that a person has suffered an injury based on the additional information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a distress call from a user device in response to an emergency event, the distress call associated with a device identifier of the user device;
   parsing the distress call to identify a location, an urgency index, and a nature of the emergency event;
   routing the distress call to an available dispatcher at a dispatcher terminal;
   identifying a response procedure to resolve the distress call based at least on the location, the urgency index, and the nature of the emergency event;
   establishing a communication channel between the dispatcher terminal and a mobile first responder terminal operated by a dispatched first responder at the location; and
   transmitting the response procedure to the mobile first responder terminal.

2. The one or more non-transitory computer-readable media of claim 1, wherein the acts further comprise:
   generating one or more tokens based at least on user input from the distress call;
   determining whether one or more keywords are identified in the one or more tokens; and
   authenticating the distress call based at least on the one or more keywords and a detected sentiment associated with the keywords.

3. The one or more non-transitory computer-readable media of claim 1, wherein the acts further comprise:
   identifying a volunteer operating a volunteer device within a predetermined distance of the location of the emergency event;
   querying the volunteer device for additional information associated with the emergency event;
   receiving a confirmation to participate from the volunteer device; and
   transmitting the response procedure to the emergency personnel.

4. The one or more non-transitory computer-readable media of claim 1, wherein the user device is associated with a volunteer.

5. The one or more non-transitory computer-readable media of claim 1, wherein the acts further comprise:
   receiving consent to access health data associated with a user of the user device;
   retrieve the health data from a user profile database associated with a user account corresponding to the device identifier; and
   transmitting the health data to the dispatcher terminal.

6. The one or more non-transitory computer-readable media of claim 1, wherein the acts further comprise:
   identifying one or more emergency contacts associated with the user device; and
   transmitting a notification to the one or more emergency contacts.

7. The one or more non-transitory computer-readable media of claim 1, wherein the acts further comprise:
   routing the distress call to a health care provider at an emergency personnel terminal.

8. A computer-implemented method, comprising:
   receiving a distress call from a user device in response to an emergency event, the distress call associated with a device identifier of the user device;
   parsing the distress call to identify a location, an urgency index, and a nature of the emergency event;
   routing the distress call to an available dispatcher at a dispatcher terminal;
   identifying a response procedure to resolve the distress call based at least on the location, the urgency index, and the nature of the emergency event;
   establishing a communication channel between the dispatcher terminal and a mobile first responder terminal operated by a dispatched first responder at the location; and
   transmitting the response procedure to the mobile first responder terminal.

9. The computer-implemented method of claim 8, further comprising:
   generating one or more tokens based at least on user input from the distress call;
   determining whether one or more keywords are identified in the one or more tokens; and
   authenticating the distress call based at least on the one or more keywords and a detected sentiment associated with the keywords.

10. The computer-implemented method of claim 8, further comprising:
    identifying a volunteer operating a volunteer device within a predetermined distance of the location of the emergency event;
    querying the volunteer device for additional information associated with the emergency event;
    receiving a confirmation to participate from the volunteer device; and
    transmitting the response procedure to the emergency personnel.

11. The computer-implemented method of claim 8, wherein the user device is associated with a volunteer.

12. The computer-implemented method of claim 8, further comprising:
    receiving consent to access health data associated with a user of the user device;
    retrieve the health data from a user profile database associated with a user account corresponding to the device identifier; and
    transmitting the health data to the dispatcher terminal.

13. The computer-implemented method of claim 8, further comprising:
    identifying one or more emergency contacts associated with the user device; and
    transmitting a notification to the one or more emergency contacts.

14. The computer-implemented method of claim 8, further comprising:
    routing the distress call to a health care provider at an emergency personnel terminal.

15. A system, comprising:
    one or more non-transitory storage mediums configured to provide stored computer-readable instructions, the one or more non-transitory storage mediums coupled to one or more processors, the one or more processors configured to execute the computer-readable instructions to cause the one or more processors to:

receive a distress call from a user device in response to an emergency event, the distress call associated with a device identifier of the user device;

parse the distress call to identify a location, an urgency index, and a nature of the emergency event;

route the distress call to an available dispatcher at a dispatcher terminal;

identify a response procedure to resolve the distress call based at least on the location, the urgency index, and the nature of the emergency event;

establish a communication channel between the dispatcher terminal and a mobile first responder terminal operated by a dispatched first responder at the location; and transmit the response procedure to the mobile first responder terminal.

16. The system of claim 15, wherein the one or more processors is further configured to:

generate one or more tokens based at least on user input from the distress call;

determine whether one or more keywords are identified in the one or more tokens; and authenticate the distress call based at least on the one or more keywords and a detected sentiment associated with the keywords.

17. The system of claim 15, wherein the one or more processors is further configured to:

identify a volunteer operating a volunteer device within a predetermined distance of the location of the emergency event;

query the volunteer device for additional information associated with the emergency event;

receive a confirmation to participate from the volunteer device; and transmit the response procedure to the emergency personnel.

18. The system of claim 15, wherein the one or more processors is further configured to:

receive consent to access health data associated with a user of the user device;

retrieve the health data from a user profile database associated with a user account corresponding to the device identifier; and transmit the health data to the dispatcher terminal.

19. The system of claim 15, wherein the one or more processors is further configured to:

identify one or more emergency contacts associated with the user device; and transmit a notification to the one or more emergency contacts.

20. The system of claim 15, wherein the one or more processors is further configured to:

route the distress call to a health care provider at an emergency personnel terminal.

* * * * *